United States Patent Office 3,461,145
Patented Aug. 12, 1969

3,461,145
Δ14-PREGNEN-3,21-DIOL-20-ONE-21 ACYLATES AND PROCESS FOR PREPARING THEM
Werner Haede, Hofheim, Taunus, Kurt Radscheit, Kelkheim, Taunus, Werner Fritsch, Neuenhain, Taunus, Ulrich Stache, Hofheim, Taunus, and Heinrich Ruschig, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Feb. 28, 1967, Ser. No. 619,204
Claims priority, application Germany, Mar. 23, 1966, 48,737
Int. Cl. C07c *169/36, 167/28*
U.S. Cl. 260—397.47      2 Claims

ABSTRACT OF THE DISCLOSURE

Δ14-pregnene-3,21-diol-20-one-21-acetates such as Δ5, 14-pregnadiene-3β,21-diol-20-one-21 acetate and Δ14-allopregnene-3β,21-diol-20-one-21-acetate, useful as intermediates in the synthesis of cardenolides. Method of making these compounds from Δ14,16-pregnadiene- or Δ5,14,16-pregnatriene-3-ol-20-one-acylates by hydrolysis, etherification with dihydropyrane, reduction of the 16,17-double bond and of the 20-oxo group, reoxidation of the resultant hydroxy group to 20-oxo, hydrolysis of tetrahydropyranyl ether groups, and acetoxylation.

U.S. Patent 2,930,791 describes a process for preparing Δ14-pregnene-3α,21-diol-20-one-21-acetate, wherein progesterone is at first converted by a biochemical method into 15α-hydroxy-progesterone; the aforesaid compound is then obtained after several chemical steps and a further biochemical process step in a yield of less than 1%.

Now, we have found that Δ14-pregnene-3,21-diol-20-one-21-acylates of the 5α-, 5β- and Δ5 series can be obtained by saponifying Δ14,16-pregnadiene- or Δ5,14,16-pregnatriene-3-ol-20-one-acylates, converting the resulting Δ14,16-pregnatriene-3-ol-20-ones into their tetrahydropyranyl ethers with dihydropyrane, hydrogenating the double bond in the 16,17-position, oxidizing the hydroxygroup which is formed by simultaneous reduction of the keto-group, separating the tetrahydropyranyl radical by hydrolysis and acyloxylating the compounds thus obtained in the 21-position.

As starting materials, there is used the 5,14,16-pregnatriene-3β-ol-20-one-acetate, which can easily be produced according to Helv. Chim. Acta 30, 385 (1947) or according to J. Org. Chem. 30, 1658 (1965), or the acylates of Δ14,16-pregnadiene-3-ol-20-ones such as 5α-pregna-Δ14,16-diene-3α-ol-20-one, 5α-pregna-Δ14,16-diene-3β-ol-20-one, 5β-pregna-14,16-diene-3α-ol-20-one or 5β-pregna-Δ14,16-diene-3β-ol-20-one, which can be produced in analogous manner are used.

These compounds may also carry other hydroxyl groups in the ring skeleton of rings A, B or C, as well as at the methyl group at C 10. These hydroxyl groups must likewise be protected intermediarily as tetrahydropyranyl ether, in the same way as the 3-hydroxyl group.

The reactions can proceed, for example, according to the following scheme:

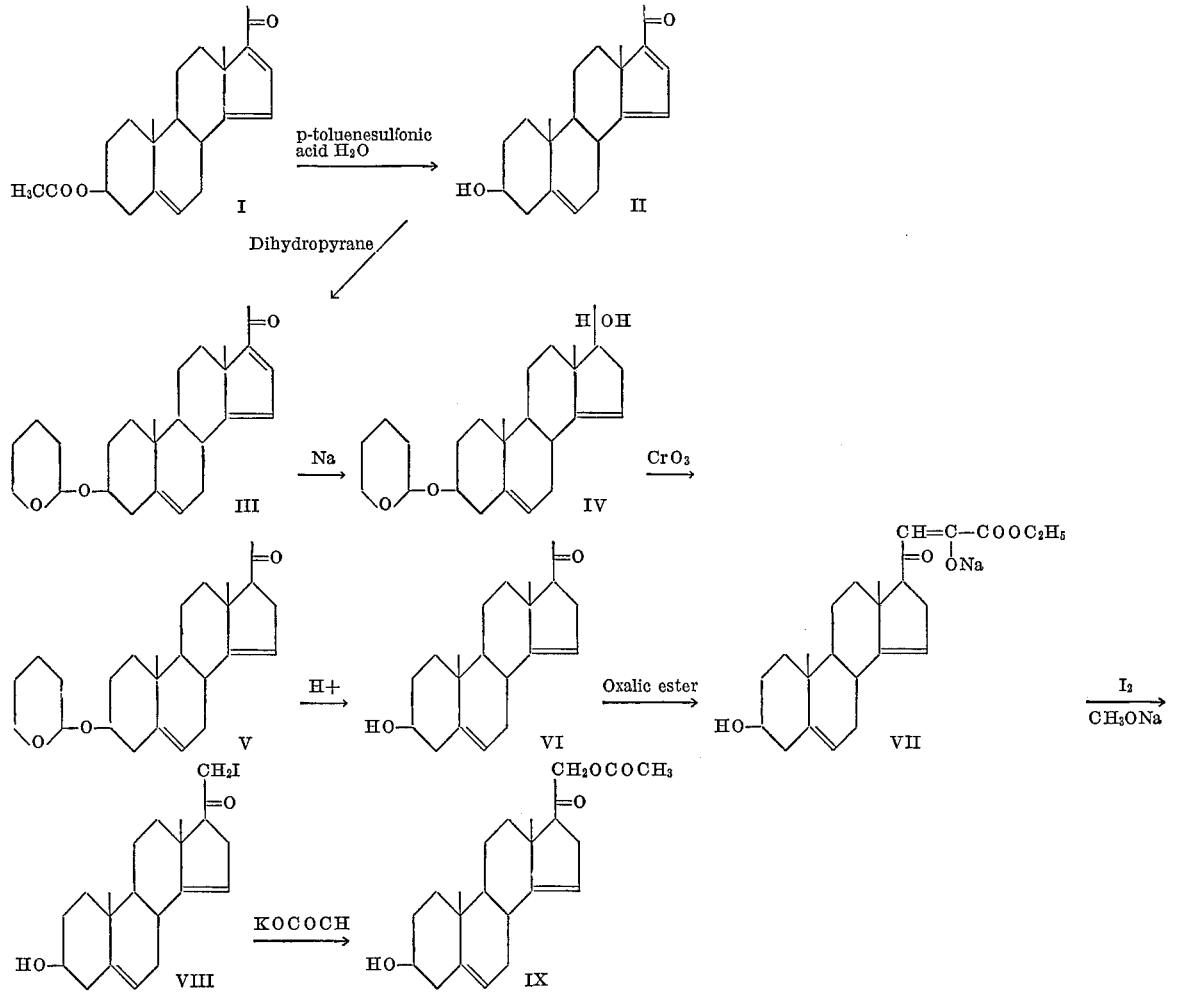

In most cases it is difficult to obtain pure Δ14,16-dienes as starting material, because the hitherto known, above mentioned processes yield products which contain at best about 75% of Δ14,16-diene and 25% of Δ16-ene (starting material) (see Helv. 30, 390 (1947)). Purification by chromatography is possible, but very expensive and involves considerable losses.

The surprising finding that the Δ14,16-pregnadiene-20-ones and the Δ16-pregnene-20-ones show an important difference in their sensitivity to alkali is an advantage of the process of the present invention. Under the conditions of alkaline saponification and/or of a later treatment with alkali, the Δ16-pregnene compound is destroyed to a large extent whereas the Δ14,16-pregnadiene compound remains unaffected. The purity of the Δ14,16-pregnadiene-3-ol-20-one is of importance in the process of the present invention. Because of the large number of reaction steps, the carrying along of one third of accompanying substance, which forms with the Δ14,16-diene a mixed crystalline product, reduces the yield of the total synthesis to minimum amounts.

In contradistinction to the yields of the hitherto known process, the yield of the process of the present invention is 10 times as high. In addition thereto, the process can be carried out in a simpler and more rapid manner, because a biochemical step is not necessary. In the known process, on the other hand, two biochemical steps are required.

It had to be expected that the Δ14,16-pregnadiene-20-ones would be sensitive to alkalies and that an attempt to saponify the 3-acyloxy group would result in an undesirable by-reaction (addition to the double bond in 16,17-position).

The saponification can be carried out, in an alkaline medium, for example in diluted alkali, such as sodium hydroxide or potassium hydroxide solutions, alkali metal alcoholates or alkali metal carbonates or bicarbonates, but also in an aqueous solution of inert solvents which are miscible with water, for example, dioxane, tetrahydrofurane or acetone in the presence of sulfonic acids, for example, p-toluene-sulfonic acid, benzene-sulfonic acid or methane-sulfonic acid.

The introduction of the tetrahydropyranyl protecting group by means of dihydropyrane in the presence of an acid catalyst, such for example, as phosphorus oxy-chloride, hydrochloric acid, or p-toluene-sulfonic acid, is followed by the selective hydrogenation of the double bond in 16,17-position. It is advantageous to effect the reduction by means of Na or Li in propanol or liquid ammonia. Since the keto group is also reduced, it is necessary to regenerate it. This is most suitably done with $CrO_3$ in pyridine. Hydrolysis of the tetrahydropyranyl ether IV is effected by means of acid catalysts such for example, as p-toluene-sulfonic acid or hydrochloric acid, by a short boiling up in an alcoholic solution or alcoholic-aqueous solution. The introduction of the acyloxy group into the 21-position of the steroid molecule is suitably effected according to the method described in Chemische Berichte, volume 88, page 876 et seq. (1955).

The products of the present invention are valuable intermediate products for the preparation of cardenolides.

The following examples illustrate the invention, but they are not intended to limit it thereto:

EXAMPLE 1

84.5 grams of Δ5,14,16-pregnadiene-3β-ol-20-one-acetate (I) are dissolved in 1.2 liters of acetone. 85 grams of p-toluene-sulfonic acid in 320 cc. of water are added to the boiling solution. The reaction solution is heated for 8 hours to the boiling temperature. It is then neutralized with a sodium acetate solution and combined with 4 liters of water. The precipitate is filtered off with suction, washed with water and then dried.

The crude product thus obtained is introduced into 400 cc. of tetrahydrofurane and combined while stirring and cooling and under an atmosphere of nitrogen with 48 cc. of dihydropyrane and 1 cc. of phosphorus oxychloride. After 1 hour at a temperature of 25° C., the reaction mixture is poured into 4 liters of a sodium bicarbonate solution having a strength of 0.5%. The precipitate which has formed is filtered off, washed with water and dried.

86.1 grams of the 3β-tetrahydropyranyl ether of Δ5,14,16-pregnatriene-3β-ol-20-one (II), melting at 165°–169.5° C. are obtained.

These 86.1 grams are dissolved in 3.25 liters of n-propanol. 160 grams of sodium are added in the course of 5 hours to the boiling solution. The residue of sodium, which has not reacted, is dissolved by the addition of methanol and the reaction solution is poured into 12 liters of water. The precipitate, which has formed, is filtered off, washed with water and dried. 82.8 grams of the 3β-tetrahydropyranyl ether of Δ5,14-pregnadiene-3β-20-diol (IV) melting at 125°–127° are obtained.

This crude product is dissolved in 2 liters of pyridine. To this solution, there are slowly added, while stirring and cooling with ice and under nitrogen, 115 grams of $CrO_3$.

The reaction mixture is stirred over night at room temperature. Then, 115 cc. of isopropanol are slowly added and the whole is stirred for 20 minutes while cooling. The reaction mixture is diluted with 4 liters of methylene chloride and filtered through a layer of $Al_2O_3$ (neutral, activity degree II). The filtrate is evaporated to dryness under reduced pressure and the residue is dissolved in ether and filtered through charcoal. After evaporation of the ether, 60 grams of the 3β-tetrahydropyranyl ether of Δ5,14-pregnadiene-3β-ol-20-one (V) remain behind as crystalline residue. This crude product is dissolved in 1.2 liters of ethanol and boiled under reflux for 1½ hours under nitrogen with 2 grams of p-toluene-sulfonic acid. After addition of 30 cc. of 2 N sodium acetate solution, the mixture is concentrated to 300 cc. and the product is precipitated by the addition of 1.5 liters of water. The precipitated product is filtered off, washed with water, dried and crystallized from ethyl acetate. Yield: 28.8 grams of Δ5,14-pregnadiene-3β-ol-20-one (VI); melting point 205°–209° C.

Acetoxylation 80 milligrams of sodium are dissolved in 2 cc. of methanol and, after addition of 10 cc. of benzene, the solution is concentrated to 4 cc. Then, 0.88 cc. of purified, freshly distilled diethyl oxalate are added at 5° C. The solution thus formed is then introduced into a hot solution of 1 gram of Δ5,14-pregnadiene-3β-ol-20-one (VI) in 40 cc. of benzene. The temperature of the reaction mixture is maintained for 20 minutes at 70° C. During that time the sodium salt of the Δ5,14-pregnadiene-3β-ol-20-one-21-oxalo ester (VII) separates, which, after cooling, is filtered off with suction and dried. This crude product (1.38 grams) is pulverized and suspended in 30 cc. of methanol. To this suspension, there is added dropwise, at 0° C., a solution of 1.2 grams of iodine in 20 cc. of methanol. When half of this iodine solution has been added, dropwise addition of 1.65 cc. of a 2 N sodium methylate solution is begun, care being taken that the addition of both solutions is completed at the same time. The whole is then stirred for 15 minutes at 20° C., and then combined with 300 cc. of water, while cooling.

The 21-iodine-Δ5,14-pregnadiene-3β-ol-20-one (VIII) which separates is filtered off with suction after some time, washed with water and dried in a desiccator over potassium hydroxide (1.5 grams of crude product). These 1.5 grams are boiled for 6 hours under reflux in a solution of 1.3 cc. of glacial acetic acid, 2.4 grams of potassium acetate and 30 cc. of water in 100 cc. of acetone. After concentration of the solution and precipitation by the addition of water, 1.0 gram of Δ5,14-pregnadiene-3β-21-diol-20-one-21-acetate (IX) are obtained in form of a crude product. Melting point: 150°–155° C. A purified sample, which has been recrystallized from diisopropyl ether, melts at 162°–164° C.

EXAMPLE 2

55 grams of a mixture as that obtained according to Helv. 30, 385 (1947), containing 72% of 14,16-allopregnadiene-3β-ol-20-one-acetate ($e_{310}$:8,600) is boiled under reflux, for 5 hours, with 45 grams of sodium bicarbonate and 450 cc. of water. The solution is then concentrated until crystallization takes place. After neutralization with concentrated hydrochloric acid, 750 cc. of water are added. After cooling, the product is filtered off with suction and dried. The crude product is crystallized from methanol and then again heated for 1 hour under reflux in 1 liter of methanol with 30 grams of sodium bicarbonate and 300 cc. of water. After concentration, neutralization and filtration with suction, the product is crystallized from methanol. 35 grams of 14,16-allopregnadiene-3β-ol-20-one, having a purity of 90% ($e_{310}$=10,800) and melting at 162°–166° C., are obtained.

This product is introduced into 120 cc. of tetrahydrofurane with 40 cc. of dihydropyrane and 0.3 cc. of phosphorus oxychloride and the whole is stirred for 24 hours at room temperature. After precipitation by means of water containing sodium bicarbonate, the tetrahydropyranyl ether is obtained in form of a crude product. After crystallization from methanol, 45 grams of the product melting at 140°–150° C., are obtained.

The crude product, obtained after reduction carried out in a manner analogous to that described in Example 1 in 1600 cc. of n-propanol with 80 grams of sodium, is dissolved in 880 cc. of pyridine and oxidized and hydrolized with 64 grams of $CrO_3$, in a manner analogous to that described in Example 1. After recrystallization from ethyl acetate, 18 grams of Δ14-allopregnene-3β-ol-20-one, melting at 181°–183° C., are obtained.

Acetoxylation 405 milligrams of sodium are dissolved in 10 cc. of methanol, and after addition of 50 cc. of benzene, the solution is concentrated to 25 cc. 4.5 cc. of purified, freshly distilled di-ethyl oxalate are added at 5° C. The solution thus formed is introduced into a hot solution of 5 grams of Δ14-allopregnene-3β-ol-20-one in 150 cc. of benzene. The reaction mixture is kept for 20 minutes at a temperature of 70° C. The sodium salt of the Δ14-allopregnene-3β-ol-20-one-21-oxalo ester which has separated is filtered off with suction, washed with benzene and dried (6.9 grams). This crude product is pulverized, suspended in 100 cc. of methanol and combined at −10° C., in the course of 30 minutes with a solution of 4.03 grams of iodine in 75 cc. of methanol. After 30 minutes, a solution of sodium methylate (365 mg. of sodium in 20 cc. of methanol) is added dropwise. The 21-iodine-Δ14-allopregnene-3β-ol-20-one which is formed, is precipitated after another 30 minutes by means of 300 cc. of water. In order to improve the separation, 300 cc. of a concentrated sodium chloride solution are added.

The crude still wet product in 350 cc. of acetone is combined with a solution of 6.5 cc. of glacial acetic acid and 12 grams of potassium acetate in 150 cc. of water and boiled for 5 hours under reflux. After concentration of the solution and addition of water, a precipitate is obtained which is filtrated off with suction and dried. This crude product is extracted with ether and the ether solution is concentrated. 2.7 grams of Δ14-allopregnene-3β, 21-diol-20-one-21-acetate, melting at 160°–164° C., are obtained. Another 0.6 gram can be recovered from the mother liquor.

We claim:
1. Δ5,14-pregnadiene-3β,21-diol-20-one-21-acetate.
2. A process for the manufacture of Δ14-pregnene-3, 21-diol-20-one-21-acetates of the 5α-, 5β-, and Δ5-series which comprises hydrolyzing a Δ14-16-pregnadiene-3-ol-20-one-acylate or a Δ5,14,16-pregnatriene-3-ol-20-one-acylate; etherifying the hydroxy group of the resultant compound with dihydropyrane to form a tetrahydropyranyl ether; reducing the 16,17-double bond with an alkali metal, whereby the keto group is also reduced to form an hydroxy group; reoxidizing this hydroxy group to a keto group with chromium trioxide; removing the tetrahydropyranyl ether group by hydrolysis; and acetoxylating the compound in the 21-position by forming its 21-oxalo-ester, reacting the ester with iodine to form the corresponding 21-iodo compound, and reacting the latter with an acetate to form the desired 21-acetate.

References Cited

UNITED STATES PATENTS 2,930,791  3/1960  Meister et al. _____ 260—239.57

ELBERT L. ROBERTS, Primary Examiner

U.S. Cl. X.R.

195—51; 260—239, 397, 999